(12) United States Patent
Robins et al.

(10) Patent No.: US 6,467,664 B2
(45) Date of Patent: Oct. 22, 2002

(54) BICYCLE CARRIER

(76) Inventors: Duncan Robins, 2720 Kelly Ave., McKinleyville, CA (US) 95519; Joseph J. Settelmayer, 72 Lyman Rd., Fieldbrook, CA (US) 99519; Scott R. Allen, 1998 Fieldbrook Rd., Fieldbrook, CA (US) 95519

( * ) Notice: Subject to any disclaimer, the term of this patent is extended or adjusted under 35 U.S.C. 154(b) by 16 days.

(21) Appl. No.: 09/951,484

(22) Filed: Sep. 10, 2001

(65) Prior Publication Data

US 2002/0038810 A1 Apr. 4, 2002

Related U.S. Application Data

(63) Continuation of application No. 09/466,233, filed on Dec. 17, 1999, now Pat. No. 6,286,738.

(51) Int. Cl.[7] .................................................. B60R 9/00
(52) U.S. Cl. ........................ 224/537; 224/553; 224/532; 224/924
(58) Field of Search ................................ 224/924, 488, 224/492, 493, 497, 502, 505, 506, 507, 531, 532, 534, 537, 553, 314; 248/292.12, 292.13

(56) References Cited

U.S. PATENT DOCUMENTS 4,856,686 A * 8/1989 Workentine ................. 224/497
5,259,542 A * 11/1993 Newbold et al.
5,775,555 A * 7/1998 Bloemer et al.
6,286,738 B1 * 9/2001 Robbins et al.

* cited by examiner

Primary Examiner—Gregory M. Vidovich

(57) ABSTRACT

A bicycle rack for carrying a bicycle adjacent the rear of a vehicle. The bicycle rack includes an adjustable frame assembly having a first frame member attached to a housing and a second frame member attached to a connecting member. The connecting member is rotationally coupled to the housing to allow relative pivotal movement between the first and second frame members. A locking member is disposed within the housing and selectively movable between a first position, in which the locking member engages the connecting member to impede relative rotational movement between the connecting member and the housing, and a second position, in which the locking member is disengaged from the connecting member to allow relative rotational movement between the connecting member and the housing. At least one support arm is coupled to the housing and configured for sliding and pivotal movement between a stowed position and an extended position in which the arm engages the housing to support a bicycle adjacent the vehicle. A mounting assembly is positionable on the support arm to hold the bicycle in place during travel.

17 Claims, 7 Drawing Sheets

BICYCLE CARRIER

CROSS-REFERENCE TO RELATED APPLICATION

This application is a continuation patent application of Ser. No. 09/466,233 filed on Dec. 17, 1999 U.S. Pat. No. 6,286,738 issued on Sep. 11, 2001 titled "Bicycle Carrier" which is hereby incorporated by reference.

FIELD OF THE INVENTION

The present invention relates to bicycle carriers, and more particularly to an adjustable bicycle carrier that may be mounted on the rear of a vehicle.

BACKGROUND

The popularity of recreational cycling has grown substantially in recent years. As a result, the demand for bicycle carriers to transport bikes on cars and other vehicles has also grown.

There are various types of vehicle-mountable bicycle carriers available. One type is mountable on the trunk or other rear portion of a vehicle to carry one or more bicycles adjacent the rear of the vehicle. While some of these carriers are adjustable to mount on different vehicles, the adjustment mechanisms are cumbersome. In addition, even normal acceleration or deceleration of the vehicle can cause the bicycles to sway or become misaligned on the carrier, resulting in damage to the bikes and/or the vehicle.

DETAILED DESCRIPTION

Figure 1:
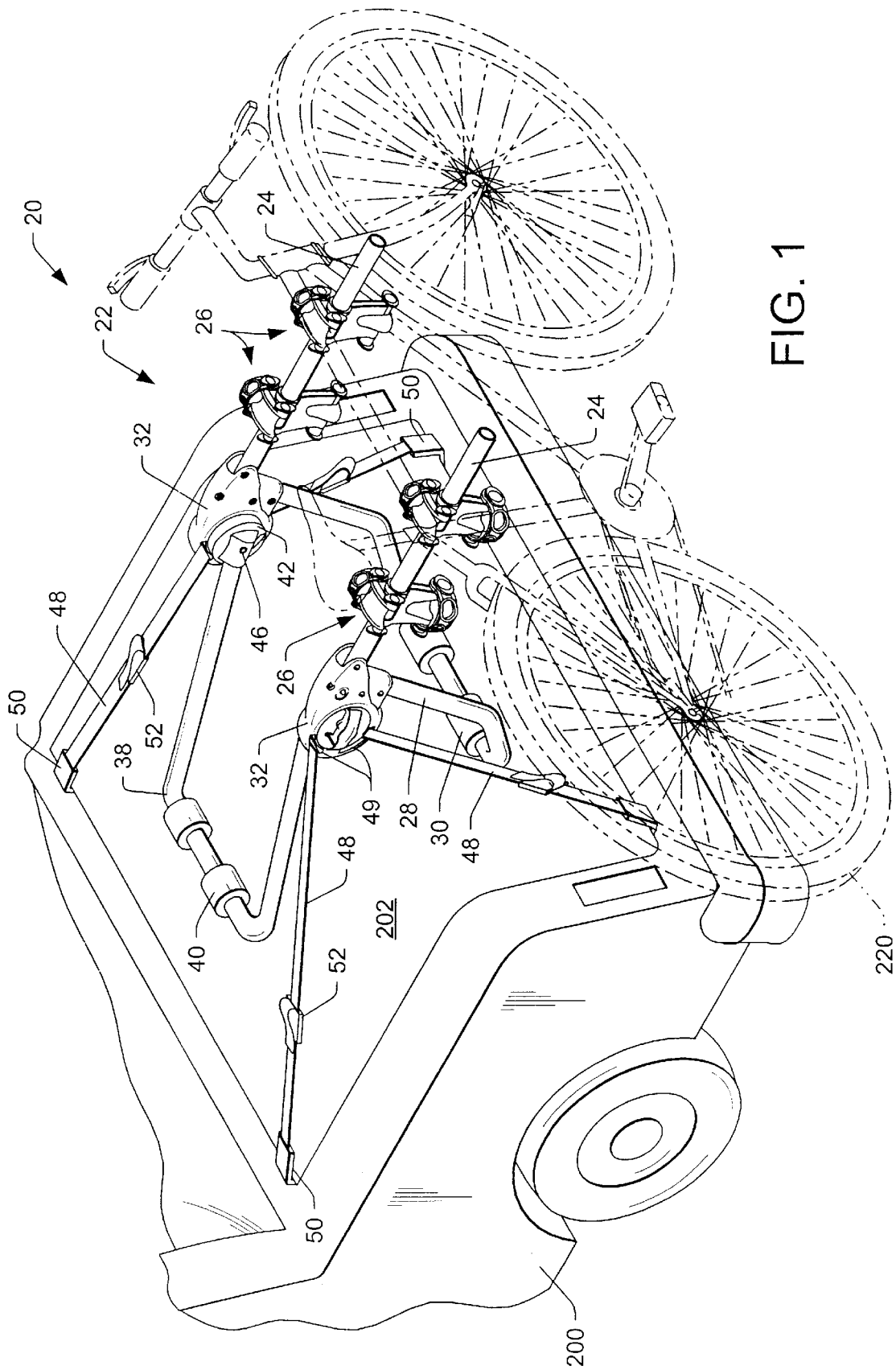
FIG. 1 is an isometric view of a bicycle rack mounted on a vehicle and supporting a bicycle according to the present invention.

A vehicle-mountable bicycle rack according to the present invention is indicated generally at 20, in FIG. 1. Bike rack 20 includes an adjustable frame assembly 22 positionable adjacent the rear of a vehicle 200, and one or more support arms 24 extending from the frame to support at least one bicycle 220 behind the vehicle. Bike rack 20 also includes one or more mounting assemblies 26 adapted to secure bike 220 to the rack and prevent the bike from swaying or becoming dislodged during operation of the vehicle.

An exemplary embodiment of frame assembly 22 is depicted in FIGS. 1–7, and includes a first frame member 28 configured to contact vehicle 200. First frame member 28 is generally U-shaped with the central, lower portion of the first frame member being inclined out of the plane of the upper portion. One or more cushioning devices such as cylindrical foam pads 30 typically are attached to the first frame member to protect the vehicle and frame assembly from scratching. First frame member 28 may be constructed out of any suitable material, such as steel tubing, and may be sized as required for compatibility with a wide variety of vehicles.

Figure 3:
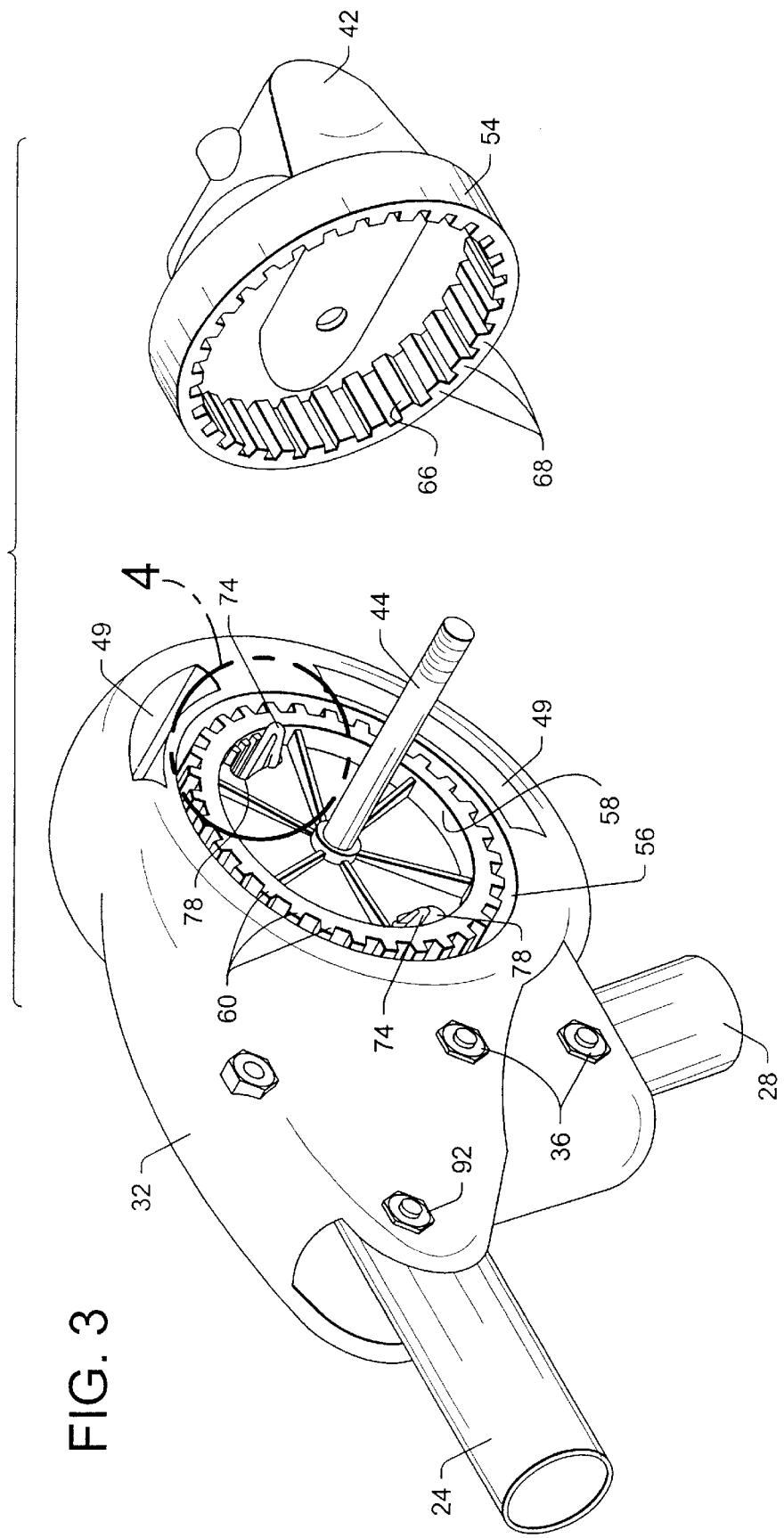
FIG. 3 is an isometric view of the inner side of the housing assembly of FIG. 2, with the connecting member removed to show the locking member.

Frame assembly 22 also includes one or more housings 32 attached to first frame member 28. As can best be seen in FIG. 7, each end of the first frame member 28 is received into a housing 32 where it is secured by bolts 34 which pass through the housing. The bolts are fastened to the housing by nuts 36, as shown in FIG. 3.

Also included in frame assembly 22 is second frame member 38, which is generally U-shaped and configured to contact vehicle 200. Second frame member 38 may include one or more cushioning devices, such as pads 40, to protect the vehicle and frame member from scratches. Second frame member 38 may be constructed out of any suitable material, including steel tubing, and may be sized as required for compatibility with a wide variety of vehicles. One or more connecting members 42 are attached to second frame member 38. In the exemplary embodiment, each end of the second frame member is received into a connecting member 42, where it is secured by a bolt 44 (best seen in FIG. 3) passing through housing 32. Bolt 44 is fastened to the housing by a nut As will be described in further detail below, each connecting member 42 is pivotally coupled to one of the housings 32, thereby permitting relative pivotal movement between first frame member 28 and second frame member 38. This allows frame assembly 22 to be adjusted to mount on vehicles of any size or configuration.

Typically frame assembly 22 is adjusted as necessary so that support arms 24 extend in a generally horizontal rearward direction when the frame assembly is positioned on the vehicle. Rack 20 is then mounted onto vehicle 200 by positioning the frame assembly against the vehicle and securing the frame assembly with one or more straps 48. Each strap is attached to a channel 49 in a housing at one end, and a hook 50 at the opposite end. Hooks 50 are configured to engage and grip portions of vehicle 200 such as trunk lid 202. In the exemplary embodiment depicted in FIG. 1, rack 20 includes four straps, two connected to each housing 32. One strap from each housing is positioned to hold the rack to the top of trunk lid 202, while the other strap from each housing is positioned to hold the rack to the bottom of trunk lid 202. Each strap may also include a buckle 52 or similar device to allow the length of the strap to be adjusted. Once the rack is positioned on the vehicle and the hooks are arranged as desired, the straps may be tightened to hold the rack securely on the vehicle.

While one exemplary method of mounting rack 20 on a vehicle has been shown and described, it will be appreciated that there are many other ways of mounting the rack within the scope of the invention. As one example, the straps may be arranged differently depending on the configuration of the vehicle. Other examples include, using a different number of straps, or holding the rack on the vehicle by fastening methods other than straps. Focusing particular attention now on FIGS. 2–6, the pivoting connection between housing 32 and connecting member 42 will be described in greater detail. Connecting member 42 includes an annular portion 54, which is received into a circular aperture 56 in the side of the housing. Bolt 44 passes through both housing 32 and connecting member 42 to hold annular portion 54 within aperture 56. Bolt 44 also passes through locking member 58, which is disposed within the housing and selectively movable between a first position and a second position. In the first position, locking member 58 engages both the housing and the connecting member to prevent relative movement therebetween. In the second position, the locking member is disengaged from the connecting member, thus allowing the connecting member to rotate or pivot within the aperture.

It will be appreciated by those of skill in the art that locking member 58 may be configured to engage the housing and the connecting member in a variety of ways. In the exemplary embodiment, locking member 58 is in the form of a wheel having a plurality of grooves or teeth 60 across its outer circumference. Housing 32 includes an inner surface 62 having a plurality of teeth 64 configured to interlock with teeth 60 of locking member 58. Thus, the locking member fits within the inner surface of the housing and is restrained from rotating within the housing by the engagement of teeth 60 with teeth 64. However, the locking member remains free to slide along its central radial axis within the housing.

Annular portion 54 of connecting member 42 also includes an inner surface 66 having a plurality of teeth 68. Surface 66 and teeth 68 are configured to receive the locking member and interlock with teeth 60 to prevent relative rotation between the connecting member and the locking member. However, the locking member remains free to slide in and out of the connecting member along the central radial axis.

Figure 5:
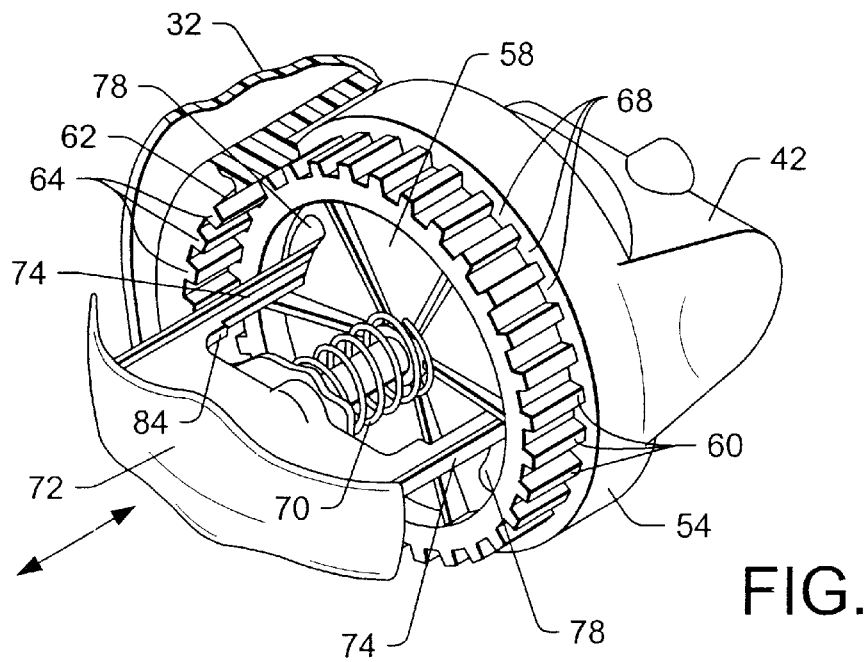
FIG. 5 is an isometric, partially cut away view showing the locking member in the first position so that the teeth of the locking member engage both the housing and the connecting member to prevent relative pivotal movement between the first and second frame members.
Figure 6:
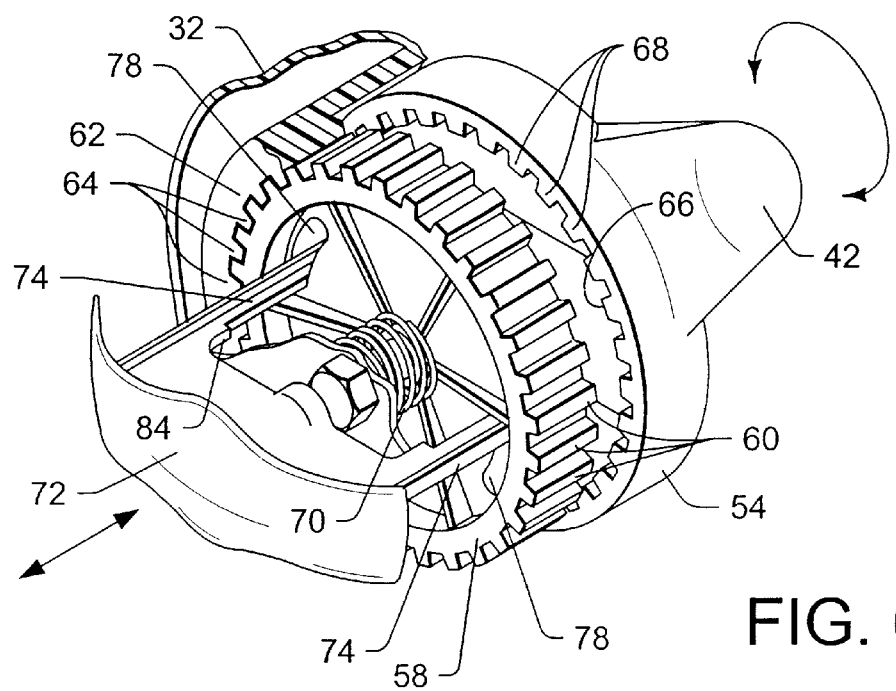
FIG. 6 is an isometric, partially cut away view showing the locking member in the second position so that the teeth of the locking member do not engage the connecting member, thus allowing relative pivotal movement between the first and second frame members.

FIGS. 5 and 6 best illustrate the engagement of the locking member with the housing and the connecting member. FIG. 5 shows the locking member in the first position, in which the locking member is at least partially received into the connecting member. Teeth 60 of the locking member interlock with teeth 64 of the housing and with teeth 68 of the connecting member to impede relative rotational movement between the connecting member and the housing. As a result, first frame member 28 is prevented from pivoting relative to second frame member 38. However, in FIG. 6, locking member 58 has been moved to the second position in which the teeth of the locking member are disengaged from the teeth of the connecting member. Thus, the connecting member is free to rotate relative to the locking member and the housing. As a result, first frame member 28 may be pivoted relative to second frame member 38.

It will be understood that to allow substantial pivotal movement between the first and second frame members, both connecting members must be rotatable relative to their corresponding housings. Thus, to adjust the frame assembly, the user disengages each locking member from the corresponding connecting member, pivots the first and/or second frame member as desired, and then re-engages each locking member with the corresponding connecting member to lock the frame assembly in the desired configuration. In the exemplary embodiment, each locking member, connecting member, and housing contains a relatively large number of teeth to allow the frame assembly to be adjusted in relatively small increments. Alternatively, each locking member, connecting member, and housing may be constructed with a relatively small number of teeth to correspond to just a few selectable angular positions between the frame members.

As also shown in FIGS. 5 and 6, frame assembly 22 also includes a biasing member 70 disposed within the housing to urge the locking member toward the first position. In the exemplary embodiment, biasing member 70 is in the form of a compression spring positioned around bolt 44 and against the side of locking member 58 opposite the connecting member. Spring 70 is compressed between the locking member and the wall of housing 32 to urge the locking member toward the first position to engage the connecting member.

A handle 72 extends through the housing and is coupled to the locking member to allow the user to move the locking member to the second position by pulling the handle away from the housing. Handle 72 includes two arms 74 which extend through slots 76 in housing 32, and through corresponding slots 78 in locking member 58. As can best be seen in the detail view of FIG. 4, each arm 74 extends through slot 74 to the other side of the locking member. A deflectable lip 80 is formed on the arm to abut against and grip the edge of slot 78 so that the locking member is pulled in the direction of biasing member 70 when the handle is pulled outward away from the housing. While it is within the scope of the invention for locking member 58 to be attached to handle 72 by any suitable method, the arm and lip structure described and depicted in the exemplary embodiment provides for easy assembly by simply aligning slots 78 with arms 74, and pressing the locking member inward against spring 70 until lips 80 snap over the edges of slots 78.

Figure 2:
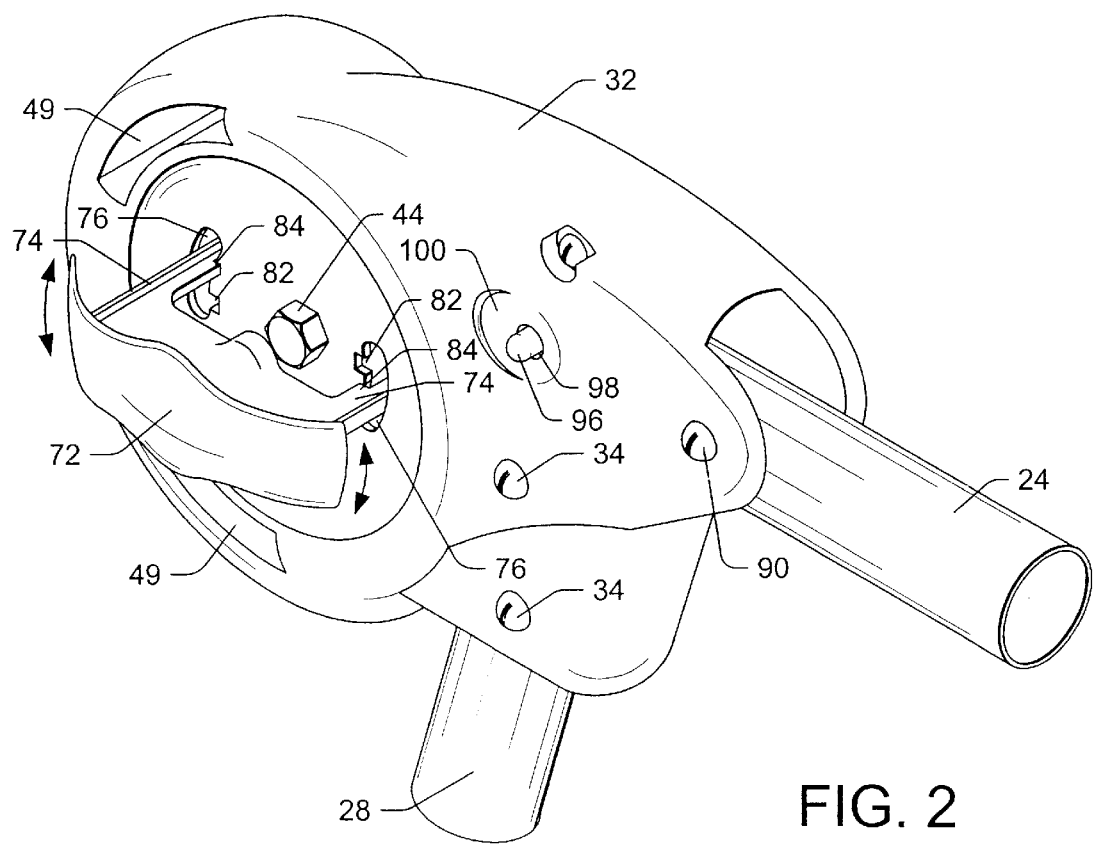
FIG. 2 is a magnified isometric view of the outer side of a housing assembly of the bicycle rack of FIG. 1, showing the handle extended and rotated to secure the locking member in the second position.

In the exemplary embodiment, the locking member is securable in the second position against the urging of the biasing member, to allow the user to adjust the frame assembly without having simultaneously to hold handles 72 away from the housings. As shown in FIG. 2, each slot 76 includes a notch 82 configured to receive a ledge 84 on arms 74. Ledges 84 prevent arms 74 from passing through slots 76 unless the arms are aligned with notches 82. Thus, to secure the locking member in the second position, the user pulls handle 72 outward from the housing and rotates the handle so that arms 74 slide along slots 76 away from notches 82. When the user releases the handle, ledges 84 strike the edges of slots 76 and prevent the locking member from returning to the first position under the urging of spring 70. FIG. 2 shows the handle pulled outward and rotated to prevent the handle from being pulled back toward the housing by spring 70. Thus, the user can disengage the locking members on each side of the frame assembly and then adjust the frame assembly as desired without having to hold the handles away from the housings. Once the frame assembly is adjusted to the desired angular configuration, the handles can be rotated to align arms 74 with notches 82 and then released, at which point spring 70 presses the locking member back into engagement with the connecting member to lock the frame assembly in the desired configuration.

Figure 4:
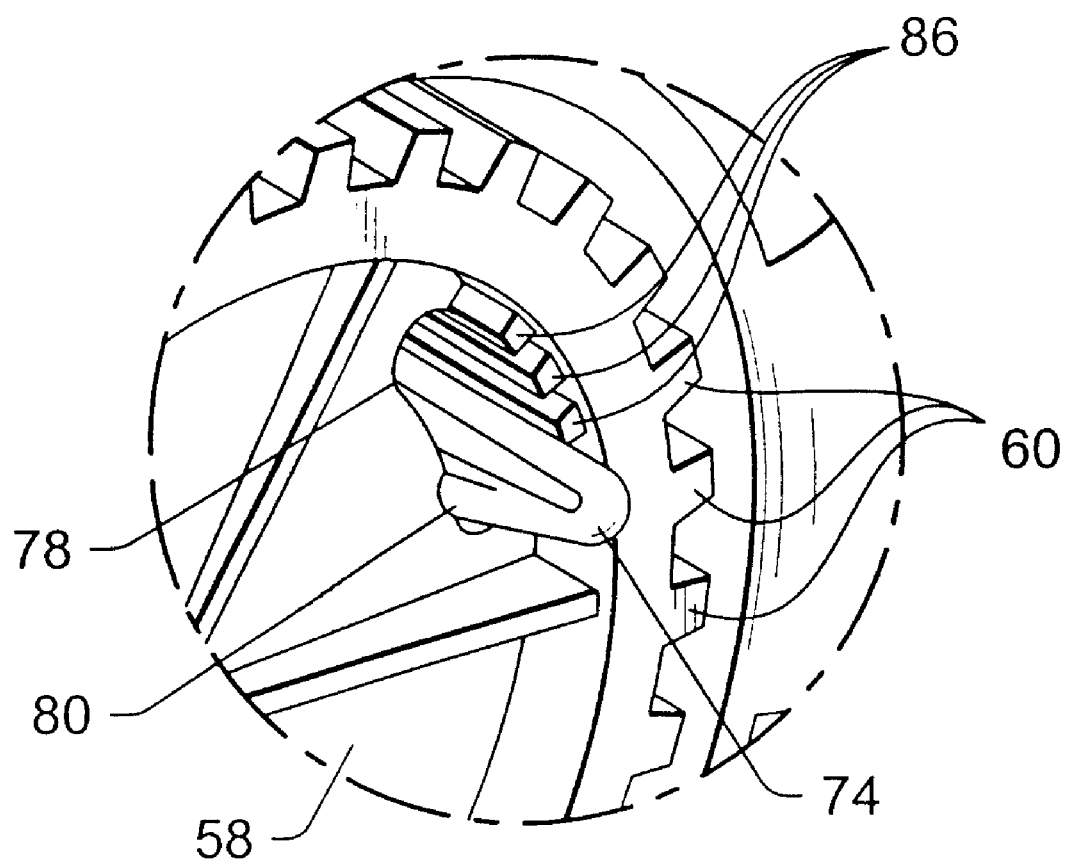
FIG. 4 is a magnified detail view of the area enclosed by dashed circle 4 in FIG. 3.

As shown in FIG. 4, locking member 58 includes a plurality of ribs 86 disposed adjacent slots 78. Ribs 86 are adapted to slightly impede rotation of arms 74 in slots 78. The ribs do not prevent the user from rotating the handle to secure the locking member in the second position. However, once the user has rotated the arms across the ribs, the ribs prevent the handle from accidentally rotating in the opposite direction and allowing the locking member to return to the first position. Arms 74 and/or ribs 86 may be rounded to allow the arms to rotate relatively smoothly past the ribs when the user rotates the handle.

As described above, frame assembly 22 is easily adjustable to be securely mounted on virtually any type and configuration of vehicle. The various parts of the frame assembly may be constructed of any material suitable for outdoor use and possessing the necessary structural strength to allow rack 20 to support the weight of one or more bicycles. While housing 32, connecting member 42, locking member 58, and handle 72 typically are constructed of a molded plastic such as nylon, other materials are also suitable.

Figure 7:
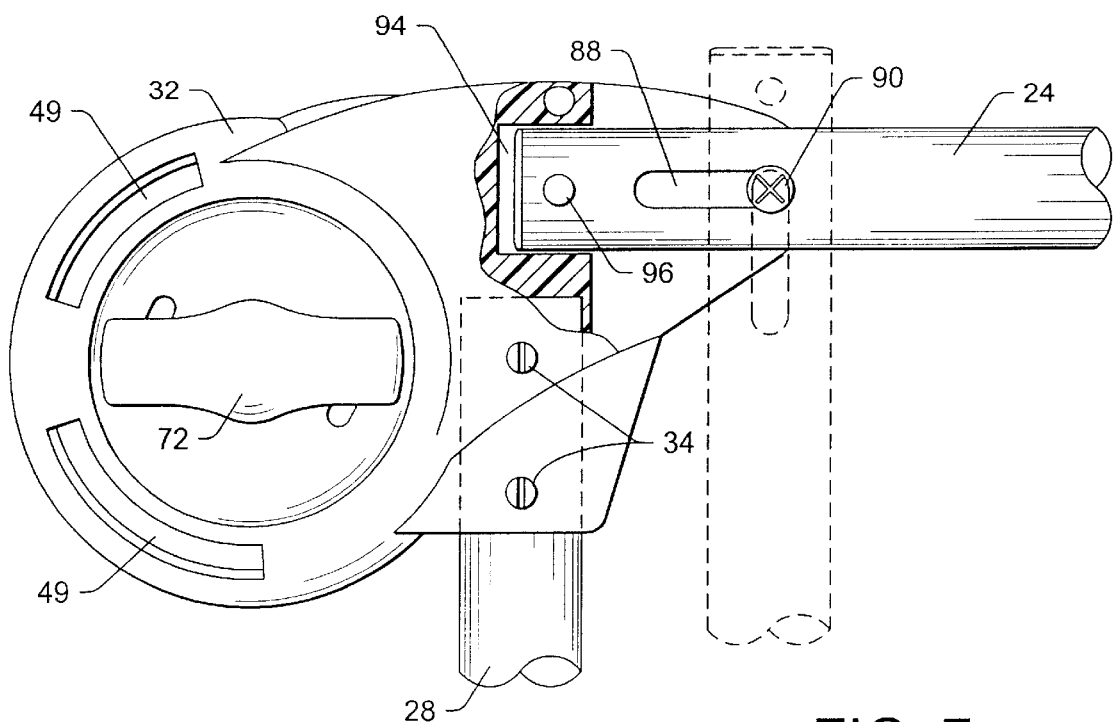
FIG. 7 is a side elevation of the housing assembly of FIG. 2, with a portion of the housing cut away to show the slidable and pivotal engagement of the support arm with the housing assembly.

Turning now to FIG. 7, it can be seen that rack 20 includes support arms 24 coupled to each housing 32 by a sliding, pivoting connection. Support arms 24 may be constructed out of any suitable material, such as steel tubing. In the exemplary embodiment, each support arm 24 includes an elongate slot 88 adjacent one end of the arm. A bolt 90 passes through the housing and through slot 88 to couple the support arm to the housing. A nut 92 (best seen in FIG. 3) holds the bolt in place. The slot-and-bolt connection of support arm 24 to housing 32 allows the support arm to pivot between a stowed position, indicated by dashed lines in FIG. 7, and an extended position, indicated by solid lines in FIG. 7. When in the extended position, the slot-and-bolt connection allows the support arm to be slid into a socket 94 within the housing. When the support arm is received into the socket, the housing engages the support arm and prevents pivotal movement of the support arm about bolt 90, thereby maintaining the support arm in the extended position to support bicycle 220 adjacent the vehicle.

Support arm 24 also includes a spring-loaded, retractable catch or pin 96, which is configured to protrude through a hole 98 in housing 32 when the support arm is received in the socket. Thus, the pin prevents the support arm from sliding out of the socket accidentally. When the user wishes to move the support arm from the extended position to the stowed position, the user presses the pin inward against the action of the spring, and then slides the support arm out of the socket. As shown in FIG. 2, housing 32 may be formed to include a depression 100 adjacent hole 98 to allow the user to press pin 96 inward. Additionally, pin 96 may be formed with a rounded end to allow it to pass through hole 98 without snagging. In any event, once the support arm is removed from the socket, it can be pivoted to the stowed position. When pin 96 clears housing 32, it will move outward to abut against the side of the housing and maintain the support arm in the stowed position. To pivot the support arm back to the extended position, the user first presses the pin inward to clear the housing, and then pivots the support arm upward.

It will be appreciated that the exemplary embodiment of rack 20 described herein may be substantially collapsed for storage when not in use. As described above, the first and second frame members may be pivoted together to extend in a single general direction, and then locked in that configuration. Additionally, the support arms may be pivoted to the stowed position adjacent and generally parallel to the first frame member, leaving rack 20 in a relatively flat configuration.

Turning attention now to FIGS. 8–11, rack 20 also includes one or more mounting assemblies 26 adapted to secure one or more bikes to support arms 24. Each mounting may comprise different components depending on the application. In the exemplary embodiment shown in FIG. 1, each mounting assembly includes a saddle mount 102, a stabilizer apparatus 104, and one or more tie-down members 106. It will be appreciated, however, that some or all of the mounting assemblies may omit one or more of these components. As one example, a particular mounting assembly may omit a stabilizer and include only a saddle mount and tie-down member. As another example, the saddle mount and/or the stabilizer may be configured to grip a bicycle without the need for a tie-down member.

As is well known in the art, bicycles typically include a frame 222 having a top tube 224, a down tube 226, and a seat tube 228. Top tube 224 extends generally forwardly and horizontally from proximate the bicycle seat to proximate the handle bars. Down tube 226 typically is coupled to the top tube proximate the handle bars and extends downwardly and rearwardly toward the pedal sprocket. Seat tube 228 typically is coupled to the top tube proximate the seat and extends generally downwardly to the pedal sprocket.

Saddle mount 102 is disposed on support arm 24 to receive and engage a portion of top tube 224 and retain the bike in a selected longitudinal position on the support arm. As shown in FIG. 1, saddle mounts typically will be disposed on both support arms and aligned to receive the top tube of a single bike. Thus, the bike is supported above the ground and retained in a stable position behind the vehicle during travel. In the exemplary embodiment, each saddle mount includes a unitary body 108 formed of molded Santoprene rubber or other suitable material adapted to grip the bike frame without causing scratches or other damage.

Body 108 is formed to define a cylindrical collar 110 adapted to fit over and engage a support arm 24, and a channel 112 extending into the body. To install a saddle mount on a support arm, the user slides the collar along the support arm to the desired location, and then rotates the saddle mount until the channel is aligned in the desired orientation. Typically, channel 112 is oriented above the support arm to allow the top tube of the bicycle to rest in the channel. Channel 112 is formed as an elongate, parabolic trough adapted to accept top tube 224. The channel is oriented in a direction generally transverse to collar 110 so that the channel extends generally across the support arms when installed on the rack. In the exemplary embodiment, the sides of channel 112 are sized to extend partially up the sides of a top tube resting in the channel. Alternatively, the sides of channel 112 may be larger or smaller as desired. In any event, channel 112 grips top tube 224 and retains the bicycle in a stable longitudinal position along the support arm during operation of the vehicle.

To prevent top tube 224 from being dislodged accidentally, one or more tie-down members 106 may be positioned over the top tube and fastened to saddle mount 102. In the exemplary embodiment, each saddle mount includes one or more anchors 114 extending from body 108. Anchor 114 includes a circular base 116 sized to fit within circular apertures 118 formed in tie-down member 106. Each anchor has a distal end 120 spaced from body 108, and one or more flanges 122 arranged about the distal end. Flanges 122 are arranged generally along a single transverse axis A to form an oval or elongate rim. Flanges 122 prevent the tie down members from slipping off circular base 116. Tie-down members 106 typically are made of a stretchable material (e.g. Dynaflex G7431 rubber), and must be stretched along axis A to allow the apertures to pass over the flanges. Thus, the tie-downs member cannot accidentally become disengaged from the anchors unless the tie-down members are stretched to clear the flanges.

Figure 11:
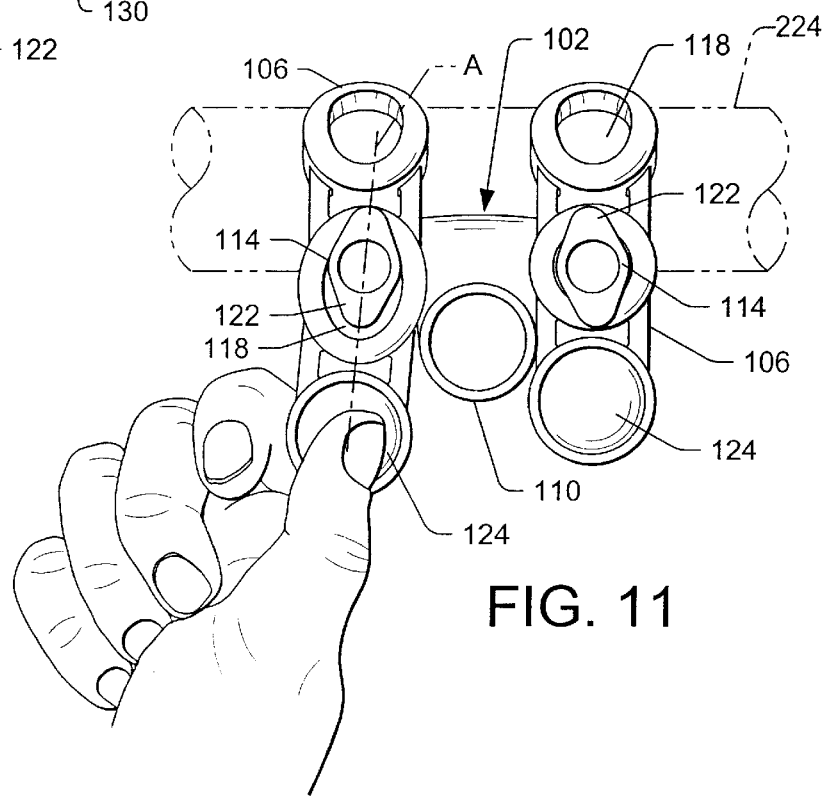
FIG. 11 is a rear elevation of a saddle mount showing one tie-down member engaged on one anchor, and another tie-down member being stretched to disengage another anchor.

Referring to the tie-down member on the left in FIG. 11, a user may secure the tie-down member to an anchor by hooking one edge of a selected aperture around one flange, and then pulling the tie-down member directly away from the hooked flange (i.e., along axis A). When the tie-down member is pulled along axis A, it will stretch along axis A causing the selected aperture to stretch over the opposite flange. Once the aperture clears the opposite flange, the user presses the tie-down member inward over the flange, and then releases the tie-down member to return to its unstretched condition, illustrated by the tie-down member on the right in FIG. 11. Tie-down member 106 may include a handle or tab 124 to allow the user to grip the tie-down member more easily. The user disengages the tie-down member by reversing the above steps. In one embodiment, the tie-down members are formed of a different, more flexible material than the saddle mounts to prevent the anchors from bending when a tie-down member is being stretched over the flanges.

In the exemplary embodiment, each saddle mount 102 includes two pairs of anchors 114, with one pair disposed adjacent opposite sides of one end of channel 112, and the other pair disposed adjacent opposite sides of the other end of channel 112. Nevertheless, it will be appreciated that other configurations are also within the scope of the invention. For example, a saddle mount may include less than or more than two pairs of anchors. In addition, it may not be necessary to engage a tie-down member to both pairs of anchors to hold the top tube within the saddle. Similarly, while tie-down members 106 are described above as being separate and removable from saddle mounts 102, an alternative embodiment of the invention may include tie-down members which are formed integrally with the saddle mounts. For example, one end of the tie-down member may extend from adjacent one side of channel 112, and be positionable over top tube 224 to engage an anchor disposed adjacent the opposite side of channel 112. Furthermore, while bases 116 and apertures 118 have been described and depicted as generally circular, it will be appreciated that these parts may be virtually any shape as desired.

Figure 8:
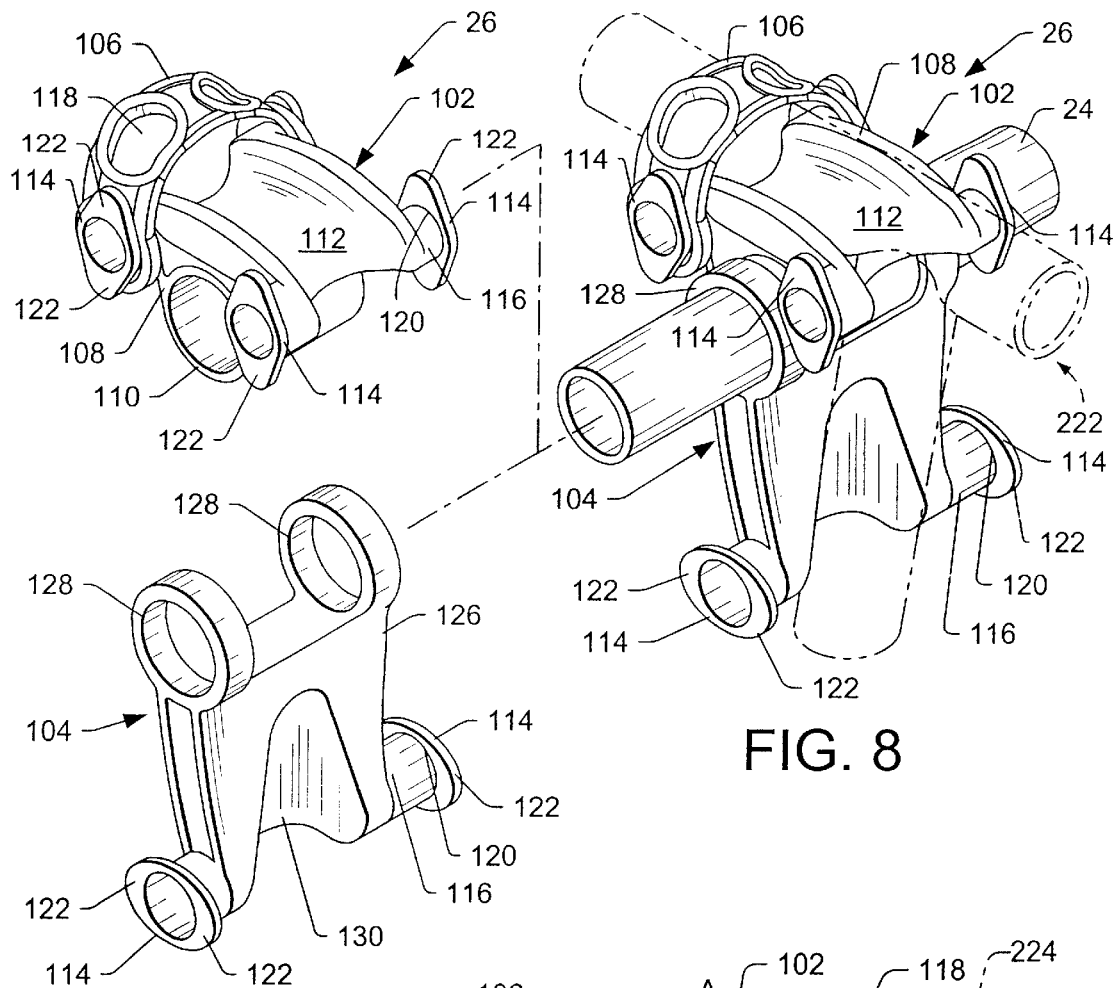
FIG. 8 is an isometric view showing a saddle mount and a stabilizer installed on a support arm and engaging a portion of a bicycle frame (shown in dashed lines). A tie-down member is shown positioned across the bicycle frame and engaging anchors on the saddle mount to hold the bicycle in position. A second saddle mount and a second stabilizer are shown in exploded view.

While saddle mounts 102 are configured to retain a bike in a selected longitudinal position on the support arm, it will be appreciated that the bike may tend to swing or sway due to the motion of the vehicle. To protect both the vehicle and bike(s) from damage due to swinging, mounting assembly 26 also includes one or more stabilizers 104 to impede swinging of the bicycle. Each stabilizer includes an integrally formed body 126 with a pair of collars 128 configured to fit over the support arm. As can be seen in FIG. 8, collars 128 are spaced apart to fit on either side of collar 110 of the saddle mount when the saddle mount and stabilizer are mounted together on the support arm. Collars 128 allow the stabilizer to slide along, and pivot about, the support arm. Because stabilizer 104 is separate from saddle mount 102, the stabilizer can pivot about the support arm independently of the saddle mount. While both collars 128 and collar 110 are typically configured to fit on support arm 24 tightly enough to prevent the mounting assembly from accidentally sliding off, the support arm may also include a removable cap (not shown) on the end of the support arm to prevent passage of the collars.

Figure 9:
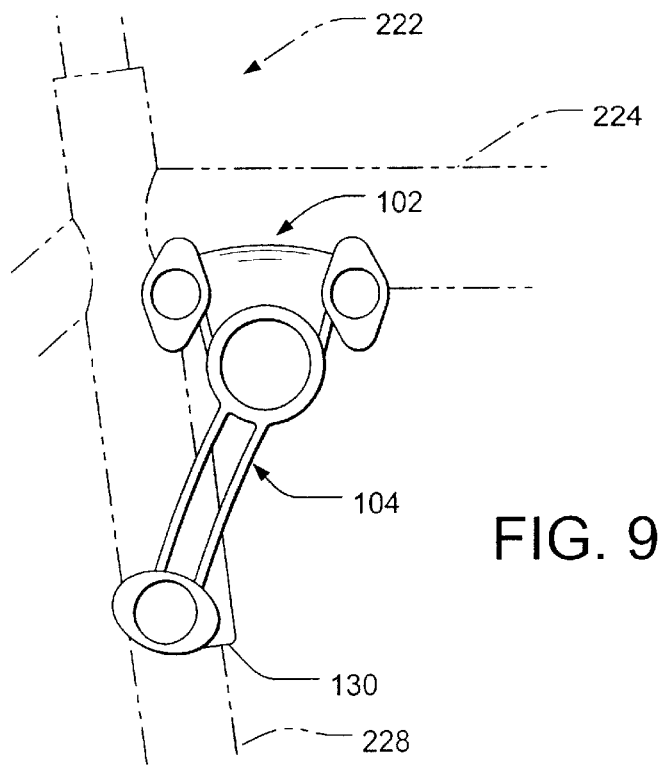
FIG. 9 is a rear elevation of a saddle mount and a stabilizer showing how the top tube of bicycle frame is supported by the saddle mount, and showing the stabilizer positioned to engage the seat tube of the bicycle frame.
Figure 10:
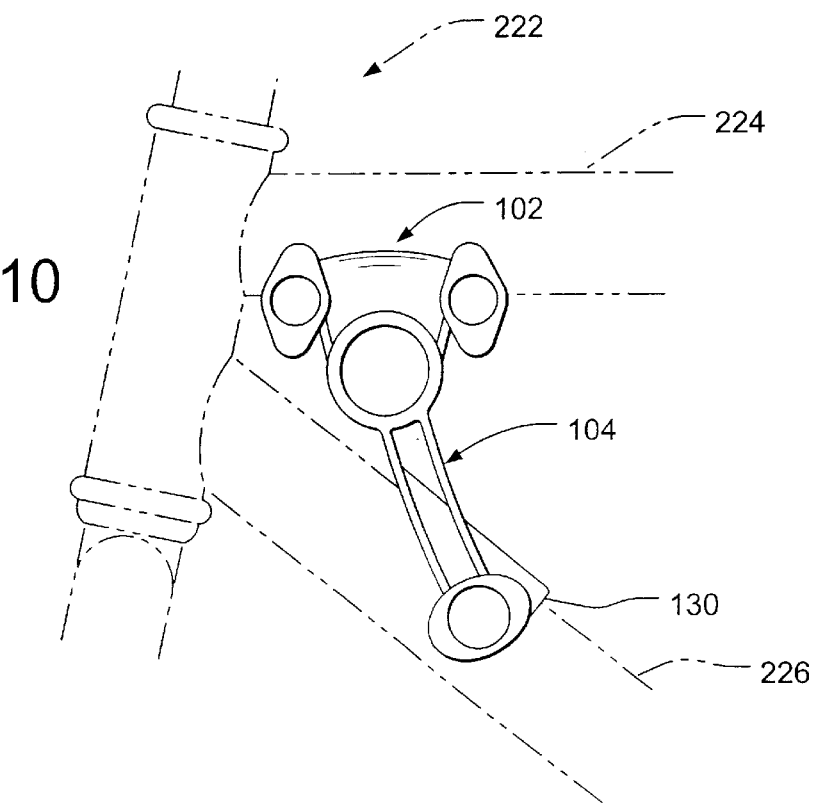
FIG. 10 is a rear elevation of a saddle mount and a stabilizer showing how the top tube of bicycle frame is supported by the saddle mount, and showing the stabilizer positioned to engage the down tube of the bicycle frame.

Body 126 is formed to define a channel 130 extending at least partially into the body, and may be constructed of any suitable material including nylon. The stabilizer typically is installed on the support arm so that the channel faces out to the side of the vehicle. The channel is configured to receive at least a portion of either down tube 226 or seat tube 228. The pivoting connection of stabilizer 104 with support arm 24 allows the user to selectively position the stabilizer to engage either the seat tube, as shown in FIG. 9, or the down tube, as shown in FIG. 10. When the seat tube or the down tube is received into channel 130, the sides of the channel prevent lateral swinging of the bicycle frame.

It will be appreciated that stabilizer 104 will provide greater stabilizing moment if it engages either the seat tube or the down tube at a location spaced from the top tube. Thus, in the exemplary embodiment, body 126 is approximately four inches long from the top of collars 128 to the bottom of channel 130, and engages the seat tube or the down tube at a location substantially spaced from the top tube of the bicycle. It will be appreciated, however, that the stabilizers may be formed either longer or shorter within the scope of the invention.

Stabilizer 104 may also include one or more anchors 114 configured to engage and secure one or more tie-down members. In the exemplary embodiment, the anchors on the stabilizers are substantially similar to the anchors on the saddle mounts so that tie-down members 106 may be secured interchangeably to either the saddle mounts or the stabilizers. Alternatively, the anchors on the stabilizers may be configured differently than the anchors on the saddle mounts for compatibility with different tie-down members. Furthermore, as described above in connection with the saddle mounts, the stabilizers may include other configurations of anchors and tie-down members within the scope of the invention.

In the exemplary embodiment shown in FIG. 1, rack 20 includes two pairs of mounting assemblies for mounting two bicycles. Alternatively, rack 20 may include only one pair of mounting assemblies for holding one bike, or three or more pairs for holding three or more bikes. Furthermore, while each mounting assembly is illustrated as including both a saddle mount and a stabilizer, it will be appreciated that a single stabilizer per bike may be sufficient to prevent the bike from swinging during travel. Indeed, for bikes with top tubes that are substantially longer than the spacing between the support arms, it may be difficult to engage both the seat tube and the down tube with stabilizers. Thus, in an alternative embodiment, a pair of mounting assemblies may include a first assembly having both a saddle mount and a stabilizer, and a second assembly having only a saddle mount. Since the stabilizer may be pivoted to engage either the seat tube or the down tube of a bike, the bike may be mounted facing either the left or the right of the vehicle regardless of which support arm the stabilizer is installed on. Indeed, it may be desirable, when carrying two or more bikes, to mount adjacent bikes facing in opposite directions so that the handle bars of the bikes do not collide. This arrangement would allow more bikes to be carried because they could be placed more closely together.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicants' invention.

We claim:

1. A bicycle rack for carrying a bicycle on a vehicle, wherein the bicycle has a top tube, a down tube, and a seat tube, comprising
   a frame attachable to the rear of the vehicle and configured to support the bicycle adjacent the vehicle,
   at least one arm extending from the frame,
   a saddle mount having a collar for receiving the arm and a trough for supporting the top tube of the bicycle, the trough having first and second opposing sides,
   at least one strap anchored to the first side of the trough, the strap being configured for selective attachment to the second side of the trough, wherein the trough and the strap together are configured to bind and encircle the circumference of a top tube of a bicycle,
   a stabilizer pivotally mounted on the arm, the stabilizer having a channel for engaging a down tube or a seat tube of the bicycle, wherein the saddle mount and the stabilizer are integrated so that they slide together along the arm, but are permitted to rotate independently around the arm to accommodate different angles between a top tube and a down tube or a seat tube.

2. The rack of claim 1 further comprising
   a strap attached to the stabilizer configured to bind a down tube or a seat tube in the channel of the stabilizer.

3. The rack of claim 1, wherein the stabilizer has two cylindrical collars configured to engage the arm on opposite sides of the collar of the saddle mount.

4. The rack of claim 1, wherein the trough on the stabilizer is elongate.

5. The rack of claim 1, wherein the trough has an elongate parabolic shape.

6. The rack of claim 1, wherein the at least one strap on the saddle mount has an end that is permanently connected to the first side of the trough, a fastener being provided on the second side of the trough so that the strap can be selectively coupled to the fastener to retain securely the top tube of the bicycle in the trough.

7. The rack of claim 1, wherein the saddle mount has two straps and a fastener for each strap.

8. The rack of claim 1, further comprising
   a second arm extending from the frame, a second saddle mount being mounted on the second arm.

9. The rack of claim 8, further comprising
   a stabilizer mounted on the second arm adjacent the second saddle mount.

10. A bicycle rack for carrying a bicycle on a vehicle, wherein the bicycle has a top tube, a down tube, and a seat tube, comprising
    a frame attachable to the rear of the vehicle and configured to support the bicycle adjacent the vehicle,
    at least one arm extending from the frame,
    a saddle mount having a collar for receiving the arm, the collar having a top side, and an elongate trough for supporting the top tube of the bicycle, the trough being positioned tangentially relative to the top side of the collar without extending around the circumference of the collar, and a stabilizer pivotally mounted on the arm, the stabilizer having a channel for
    engaging a down tube or a seat tube of the bicycle, wherein the saddle mount and the stabilizer are integrated so that they slide together along the arm, but are permitted to rotate independently around the arm to accommodate different angles between a top tube and a down tube or seat tube.

11. The rack of claim 10, wherein the trough has first and second opposing sides, further comprising
    at least one strap anchored to the first side of the trough, the strap being configured for selective attachment to the second side of the trough, wherein the trough and the strap together are configured to enclose the entire circumference of a top tube of a bike.

12. The rack of claim 10, further comprising
    a strap attached to the stabilizer configured to bind a down tube or a seat tube in the channel of the stabilizer.

13. The rack of claim 10, wherein the stabilizer has two cylindrical collars configured to engage the arm on opposite sides of the collar of the saddle mount.

14. The rack of claim 11, wherein the at least on strap on the saddle mount has an end that is permanently connected to the first side of the trough, a fastener being provided on the second side of the trough so that the strap can be selectively coupled to the fastener to retain securely the top tube of the bicycle in the trough.

15. The rack of claim 10, wherein the saddle mount has two straps and a fastener for each strap.

16. The rack of claim 10, further comprising
    a second arm extending from the frame, a second saddle mount being mounted on the second arm.

17. The rack of claim 16, further comprising
    a stabilizer mounted on the second arm adjacent the second saddle mount.

* * * * *